US010126724B2

(12) United States Patent
Scheckelhoff et al.

(10) Patent No.: US 10,126,724 B2
(45) Date of Patent: Nov. 13, 2018

(54) LOW POWER MANAGEMENT SYSTEM

(71) Applicant: General Electric Company, Schenectady, NY (US)

(72) Inventors: Ryan James Scheckelhoff, Louisville, KY (US); Steven Keith Root, Buckner, KY (US); Ryan Michael Hartlage, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 309 days.

(21) Appl. No.: 15/062,496

(22) Filed: Mar. 7, 2016

(65) Prior Publication Data
US 2017/0255174 A1 Sep. 7, 2017

(51) Int. Cl.
G05B 19/042 (2006.01)
(52) U.S. Cl.
CPC .... *G05B 19/042* (2013.01); *G05B 2219/2613* (2013.01); *G05B 2219/2639* (2013.01)
(58) Field of Classification Search
None
See application file for complete search history.

(56) References Cited

U.S. PATENT DOCUMENTS

| | | | | |
|---|---|---|---|---|
| 5,168,208 A | * | 12/1992 | Schultz | H02P 9/04 322/25 |
| 5,182,810 A | * | 1/1993 | Bartling | G06F 1/26 713/321 |
| 5,630,142 A | * | 5/1997 | Crump | G06F 1/325 713/323 |
| 6,107,611 A | * | 8/2000 | Jones | E04D 13/103 219/213 |
| 6,408,170 B1 | * | 6/2002 | Schmidt | G06F 11/0739 455/344 |

(Continued)

FOREIGN PATENT DOCUMENTS

| | | |
|---|---|---|
| EP | 0798625 A2 | 10/1997 |
| WO | WO2010031018 | 3/2010 |

OTHER PUBLICATIONS

Eieland, "Turn Power-Reducing Features into Low-Power Systems," Atmel Corporation Journal, Mar. 2015—6 Pages.

*Primary Examiner* — Michael Lebentritt
(74) *Attorney, Agent, or Firm* — Dority & Manning, P.A.

(57) ABSTRACT

Systems and methods for managing appliance power consumption. In one embodiment, an appliance can include a plurality of microcontrollers. Each of the microcontrollers can be associated with at least one appliance component. The appliance can further include one or more low power management microcontrollers. The low power management microcontrollers can be configured to monitor a state of each of the microcontrollers. The low power management microcontrollers can be further configured to determine that one or more of the microcontrollers of the plurality of microcontrollers are in an inactive state. The low power management microcontrollers can be configured to send one or more command signals to place the one or more microcontrollers in the inactive state in a lower power mode based at least in part on the determination that the microcontroller is in the inactive state. The respective microcontroller can consume less power in the lower power mode than while in an active state.

17 Claims, 4 Drawing Sheets

(56) References Cited

U.S. PATENT DOCUMENTS

| | | | |
|---|---|---|---|
| 6,414,864 B1 | 7/2002 | Hoshi | |
| 6,438,462 B1* | 8/2002 | Hanf | G06F 1/3203 340/693.4 |
| 6,629,776 B2* | 10/2003 | Bell | G01K 7/245 340/539.1 |
| 8,010,819 B2* | 8/2011 | Pastorello | H03K 19/0016 327/540 |
| 8,570,564 B2* | 10/2013 | Coffey | G03G 15/5004 358/1.13 |
| 8,943,335 B2* | 1/2015 | Holsen | G06F 1/263 320/132 |
| 9,021,284 B2 | 4/2015 | Freiwald et al. | |
| 9,304,571 B2* | 4/2016 | Herbeck | G06F 1/3206 |
| 9,329,919 B2* | 5/2016 | Pickel | G06F 11/0739 |
| 9,436,268 B2* | 9/2016 | de Santiago Dominguez | G06F 1/3284 |
| 2002/0166044 A1* | 11/2002 | Muth | G06F 1/24 713/1 |
| 2002/0180599 A1* | 12/2002 | Broker | G09G 3/18 340/501 |
| 2004/0210419 A1* | 10/2004 | Wiebe | F25B 49/005 702/182 |
| 2005/0041360 A1* | 2/2005 | Dettweiler | H02J 9/005 361/160 |
| 2006/0121936 A1* | 6/2006 | Paver | G06F 1/3203 455/552.1 |
| 2007/0156864 A1* | 7/2007 | McCoy | G06F 9/545 709/222 |
| 2007/0193286 A1* | 8/2007 | Karlsson | F25B 49/043 62/148 |
| 2008/0106148 A1* | 5/2008 | Gelonese | G06F 1/266 307/39 |
| 2009/0235105 A1* | 9/2009 | Branover | G06F 1/3203 713/330 |
| 2010/0058083 A1* | 3/2010 | Rangeley | G06F 1/26 713/320 |
| 2010/0115317 A1* | 5/2010 | Aurich | G06F 1/32 713/323 |
| 2011/0055434 A1* | 3/2011 | Pyers | G06F 1/3203 710/14 |
| 2011/0078475 A1* | 3/2011 | Juenemann | G06F 1/3203 713/320 |
| 2011/0099401 A1* | 4/2011 | Steinle | G06F 1/3203 713/323 |
| 2011/0125337 A1* | 5/2011 | Zavadsky | G06F 1/263 700/291 |
| 2012/0032624 A1* | 2/2012 | Peterson | H02P 23/0077 318/479 |
| 2012/0037185 A1* | 2/2012 | Ellingson | A47L 15/0005 134/18 |
| 2012/0166918 A1* | 6/2012 | Svendsli | H02J 7/0029 714/807 |
| 2012/0271468 A1* | 10/2012 | Doljack | H02J 9/005 700/286 |
| 2013/0038143 A1* | 2/2013 | Koanantakool | H02J 9/005 307/143 |
| 2013/0221117 A1* | 8/2013 | Warren | G05D 23/19 236/1 C |
| 2014/0008357 A1 | 1/2014 | Cheng et al. | |
| 2016/0004292 A1* | 1/2016 | Sharda | G06F 1/3243 710/317 |

* cited by examiner

LOW POWER MANAGEMENT SYSTEM

FIELD OF THE INVENTION

The present disclosure relates generally to managing appliance power consumption and more particularly to orchestrating low power management amongst components of an appliance.

BACKGROUND OF THE INVENTION

Modern appliances, particularly home appliances such as ovens, ranges, cook tops, washers, etc. are frequently provided with electronic features such as clocks, timers, and displays. These features require electricity not only when the appliance is in use but also when the appliance is not in use. More particularly, when not in use, an appliance enters into standby mode until the next event requiring operation of the appliance due to e.g., the user turning on the appliance or a timer activating the appliance. While in standby mode, the appliance still continues to consume a certain amount of energy to maintain operation of at least a portion of the electronics such as e.g., the clock or a timer and an associated display.

It is desirable to limit the amount of power that an appliance requires from an external supply during standby mode. For example, industry standards and/or government regulations may limit the maximum amount of power that an appliance can draw from the electrical power system of a home or business during standby mode.

Unfortunately, the features associated with such electronics in many modern appliances require a certain minimal amount of power even during standby mode. This minimal amount may exceed the maximum power consumption limitation provided by industry standards and/or government regulations. While advances are being made in reducing the amount of power required by such appliance electronics during standby mode, these advances may not be able to provide electronics having all of the features desired by consumers while simultaneously reducing the power consumption during standby mode to a level that is below the maximum consumption limitation of industry standards and/or government regulations.

BRIEF DESCRIPTION OF THE INVENTION

Aspects and advantages of the present disclosure will be set forth in part in the following description, or may be obvious from the description, or may be learned through practice of the present disclosure.

One example aspect of the present disclosure is directed to an appliance. The appliance can include a plurality of system microcontrollers. Each of the system microcontrollers can be associated with at least one appliance component. The appliance can further include one or more low power management microcontrollers configured to monitor a state of each of the system microcontrollers of the plurality of system microcontrollers. The one or more low power management microcontrollers can be further configured to determine that one or more of the system microcontrollers of the plurality of system microcontrollers are in an inactive state. The one or more low power management microcontrollers can be configured to send one or more command signals to place the one or more system microcontrollers in the inactive state in a lower power mode based at least in part on the determination that the system microcontroller is in the inactive state. The respective system microcontroller can consume less power in the lower power mode than while in an active state.

Another example aspect of the present disclosure is directed to a method of managing appliance power consumption. The method can include monitoring, by one or more low power management microcontrollers, a state of each of a plurality of system microcontrollers associated with an appliance. The method can further include determining, by the one or more low power management microcontrollers, that one or more of the plurality of system microcontrollers are in an inactive state. The method can include sending, by the one or more low power management microcontrollers, one or more command signals to place the one or more system microcontrollers in the inactive state in a lower power mode based at least in part on the determination that the one or more system microcontrollers is in the inactive state. The lower power mode can be associated with a reduced power consumption by the respective system microcontroller than while in an active state.

Yet another example aspect of the present disclosure is directed to a dishwashing appliance. The dishwashing appliance can include a first system microcontroller associated with a user interface, a second system microcontroller associated with one or more relays, and a third system microcontroller associated with a drain pump assembly. The dishwashing appliance can further include one or more low power management microcontrollers. The one or more processors can be configured to monitor one or more communications associated with at least one of the first system microcontroller, second system microcontroller, or third system microcontroller. The one or more communications can be indicative of a state of least one of the first system microcontroller, second system microcontroller, or third system microcontroller. The one or more low power management microcontrollers can be further configured to determine that at least one of the first system microcontroller, second system microcontroller, or third system microcontroller is in an inactive state based at least in part on the one or more communications. The one or more low power management microcontrollers can be further configured to place the at least one system microcontroller in the inactive state in the lower power mode based at least in part on the determination that the respective system microcontroller is in the inactive state. The respective system microcontroller can consume less power in the lower power mode than while in an active state.

Variations and modifications can be made to these example embodiments of the present disclosure.

These and other features, aspects and advantages of the present disclosure will become better understood with reference to the following description and appended claims. The accompanying drawings, which are incorporated in and constitute a part of this specification, illustrate embodiments of the invention and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION OF THE INVENTION

Figure 1:
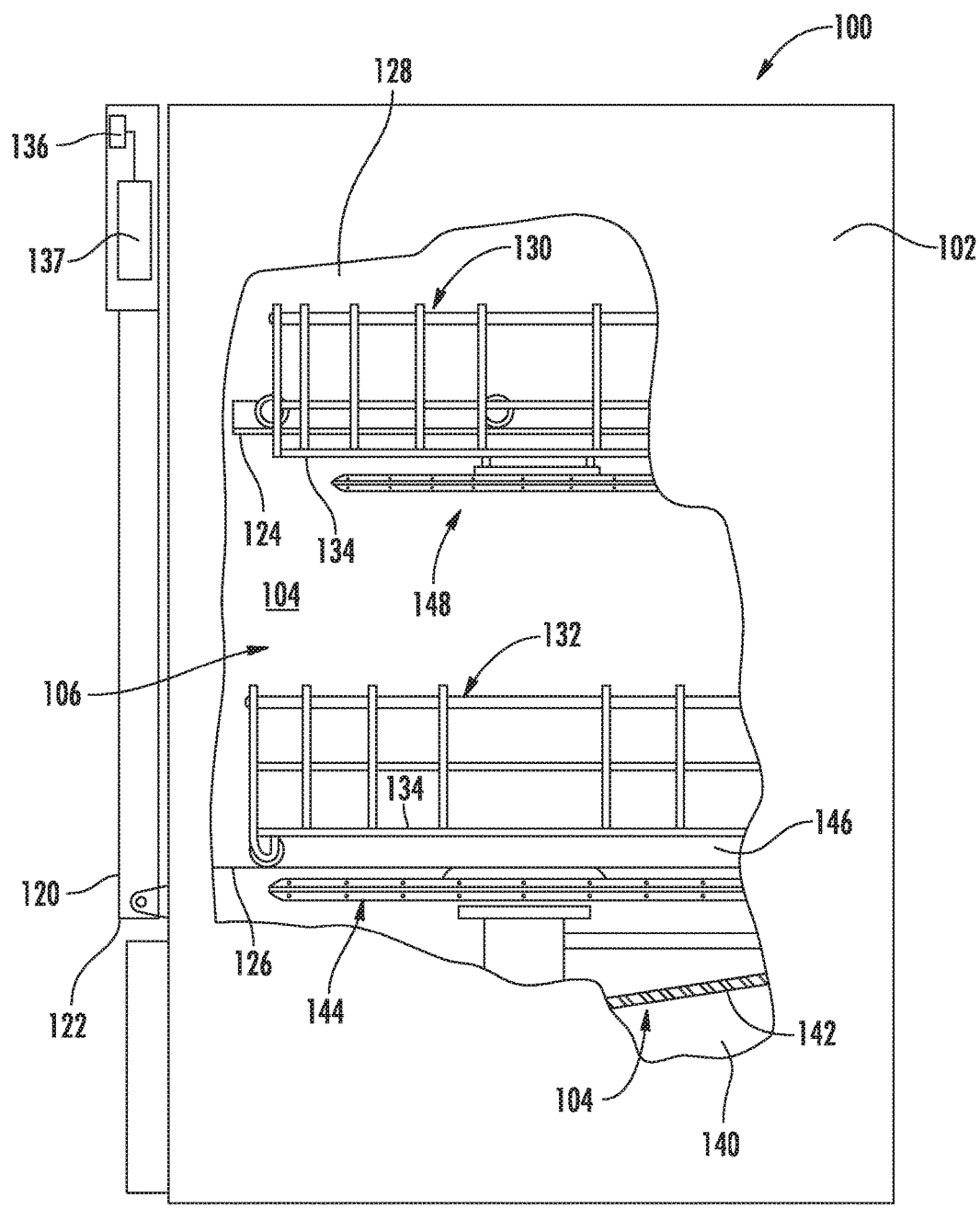
FIG. 1 depicts a side partial cut-away view of an appliance according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods for managing the power consumption of an appliance. For instance, an appliance can include a plurality of system microcontrollers each of which can be associated with one or more components of the appliance, such as a user interface, a relay, a pump assembly, etc. The system microcontrollers can be in an active state (e.g., during operation of the appliance) and an inactive state (e.g., when the appliance or its associated component is not in operation). A system microcontroller can consume power while in the active state. The system microcontroller can also consume power while in the inactive state while it monitors for signals to operate its respective component.

The appliance can also include one or more low power management microcontroller(s) configured to manage the power consumption of the system microcontrollers. The low power management microcontroller(s) can be, for example, a microcontroller with low power requirements than the system microcontrollers. The low power management microcontroller(s) can monitor a state of each of the system microcontrollers and determine that the system microcontrollers are in the inactive state. Thereafter, the low power management microcontroller(s) can place the system microcontrollers in a lower power mode (e.g., associated with lower power requirements than the active or inactive states). Instead of having the system microcontrollers monitor for stimulus signals indicating a need for the appliance to return to the active state (e.g., because a user wishes to operate the appliance), the low power management microcontroller(s) can monitor for the stimulus signals while the microcontrollers are in the lower power mode (e.g., consuming little to no power).

By using the low power management microcontroller(s) and not the system microcontrollers to monitor and manage the state of the system microcontrollers, the power consumption of the appliance can be reduced. For example, the functions of the low power management microcontroller(s) can be limited to those described herein (e.g., monitoring for communications, stimulus signals, etc.). These functions can require less power than if each of the system microcontrollers were to perform such functions itself. As such, the equipment of the low power management microcontroller(s) can have a reduced power requirement relative to the system microcontrollers. Accordingly, use of the low power management microcontroller(s) in the manner described herein can reduce the overall power consumption of the appliance, particularly while in a lower power mode.

More specifically, the low power management microcontroller(s) can monitor a state of each of the system microcontrollers. For example, the low power management microcontroller(s) can monitor and/or receive one or more communication(s) from the system microcontrollers. The communication(s) can indicate that at least one of the system microcontrollers is in an active state. The low power management microcontroller(s) can determine whether one or more of the system microcontrollers are in an inactive state, when the low power management microcontroller(s) cease receiving the communication(s) indicating that the system microcontroller is in an active state.

The low power management microcontroller(s) can place one or more of the system microcontrollers in a lower power mode based, at least in part, on the determination that the one or more system microcontrollers are in the inactive state. For instance, the low power management microcontroller(s) can send command signals to place one or more of the system microcontrollers (that are in the inactive state) in a lower power mode. The low power management microcontroller(s) can send the one or more command signals directly to the system microcontrollers. Additionally and/or alternatively, the low power management microcontroller(s) can send command signals to the one or more power source(s) associated with the appliance to reduce the power provided to the system microcontrollers.

The low power management microcontroller(s) can also remove the system microcontrollers from the lower power mode. For instance, a user intending to operate the appliance can interact with the appliance's user interface. A stimulus device (e.g., controller, sensor, other processor) associated with the user interface can sense such interaction and send a stimulus signal indicating the need for one or more of the system microcontrollers to return to the active state. The low power management microcontroller(s) can monitor for stimulus signals (e.g., by sniffing one or more bus) and can receive the stimulus signal from the stimulus device. The low power management microcontroller(s) can then send command signals to remove at least one system microcontroller from the lower power mode such that the appliance (or at least some of its components) can be operated in accordance with the user's intentions.

The systems and methods according to example aspects of the present disclosure can reduce the power consumption of an appliance. More particularly, the systems and methods of the present disclosure can increase energy efficiency by utilizing a low power processor to co-ordinate lower power entry and exit of the system microcontrollers and appliance components. Use of the low power processor can provide a drop-in solution for existing appliances, allowing for a faster, lower risk solution for power management than custom approaches for each appliance. In this way, the systems and methods according to example aspects of the present disclosure have a technical effect of efficiently reducing power consumption and providing a consistent power management sequence across product lines, further reducing associated appliance costs.

FIG. 1 depicts a side partial cut-away view of an appliance 100 according to example embodiments of the present disclosure. In some implementations, the appliance 100 can be a washing appliance such as, for example, a dishwashing appliance. The appliance 100 can include a cabinet 102 having a tub 104 therein that defines a wash chamber 106. The tub 104 can have a door 120 hinged at its bottom 122 for movement between a normally closed vertical position (shown in FIG. 1) wherein the wash chamber 106 can be sealed shut for washing operation, and a horizontal open position for loading and unloading of articles from the wash chamber 106 of the appliance 100.

Upper and lower guide rails 124, 126 can be mounted on tub side walls 128 and accommodate upper and lower roller-equipped racks 130, 132, respectively. Each of the upper and lower racks 130, 132 can be fabricated into lattice structures including a plurality of elongate members 134, and each of the racks 130, 132 can be adapted for movement between an extended loading position (not shown) in which the racks 130, 132 can be substantially positioned outside the wash chamber 106, and a retracted position (shown in FIG. 1) in which the racks 130, 132 can be located inside the wash chamber 106.

The appliance 100 can further include a lower spray assembly 144 that can be mounted (e.g., rotatably) within a lower region 146 of the wash chamber 106 and above a tub sump portion 142 so as to rotate in relatively close proximity to the lower rack 132. A mid-level spray assembly 148 can be located in an upper region of the wash chamber 106 and can be located in close proximity to the upper rack 130. Additionally, an upper spray assembly (not shown) can be located above the upper rack 130.

The lower and mid-level spray assemblies 144, 148 and upper spray assembly can be fed by a fluid circulation assembly (not shown) for circulating water and dishwasher fluid in the tub 104. The fluid circulation assembly can be located in a machinery compartment 140 located below the bottom sump portion 142 of the tub 104. Each spray assembly can include an arrangement of discharge ports or orifices for directing washing fluid onto dishes or other articles located in the upper and lower racks 130, 132, respectively. In an example implementation, the arrangement of the discharge ports in at least the lower spray assembly 144 can provide a rotational force by virtue of washing fluid flowing through the discharge ports. The resultant rotation of the lower spray assembly 144 can provide coverage of dishes and other dishwasher contents with a washing spray.

The appliance 100 can be further equipped with a processing device or controller 137 to regulate operation of the appliance 100. The controller 137 can include a memory and microprocessor, such as a general or special purpose microprocessor operable to execute programming instructions or micro-control code (e.g., associated with a cleaning cycle). The memory may represent random access memory such as DRAM, or read only memory such as ROM or FLASH. In one implementation, the processor can execute programming instructions stored in memory. The memory can be a separate component from the processor or can be included onboard within the processor.

The controller 137 can be positioned in a variety of locations throughout the appliance 100. As shown in FIG. 1, the controller 137 can be located within a control panel area of the door 120. In such an implementation, input/output ("I/O") signals can be routed between the control system and various operational components of the appliance 100 along wiring harnesses that can be routed through the bottom 122 of the door 120. Typically, the controller 137 can include a user interface panel 136 through which a user can select various operational features and modes and monitor progress of the appliance 100. In one implementation, the user interface 136 can represent a general purpose I/O ("GPIO") device or functional block. In implementation, the user interface 136 can include input components, such as one or more of a variety of electrical, mechanical or electro-mechanical input devices including rotary dials, push buttons, and touch pads. The user interface 136 can include a display component, such as a digital or analog display device designed to provide operational feedback to a user. The user interface 136 can be in communication with the controller 137 via one or more signal lines or shared communication busses.

It should be appreciated that the present disclosure is not limited to any particular type, style, model, or other configuration of appliance, and that the appliance 100 depicted in FIG. 1 is for illustrative purposes only. While the figures and description herein discuss the present disclosure with reference to a washing appliance (e.g., a dishwashing appliance), one of ordinary skill in the art will understand that the present disclosure is not limited to a washing appliance. For instance, aspects of the present disclosure can be implemented in any power cycle-based appliance.

Figure 2:
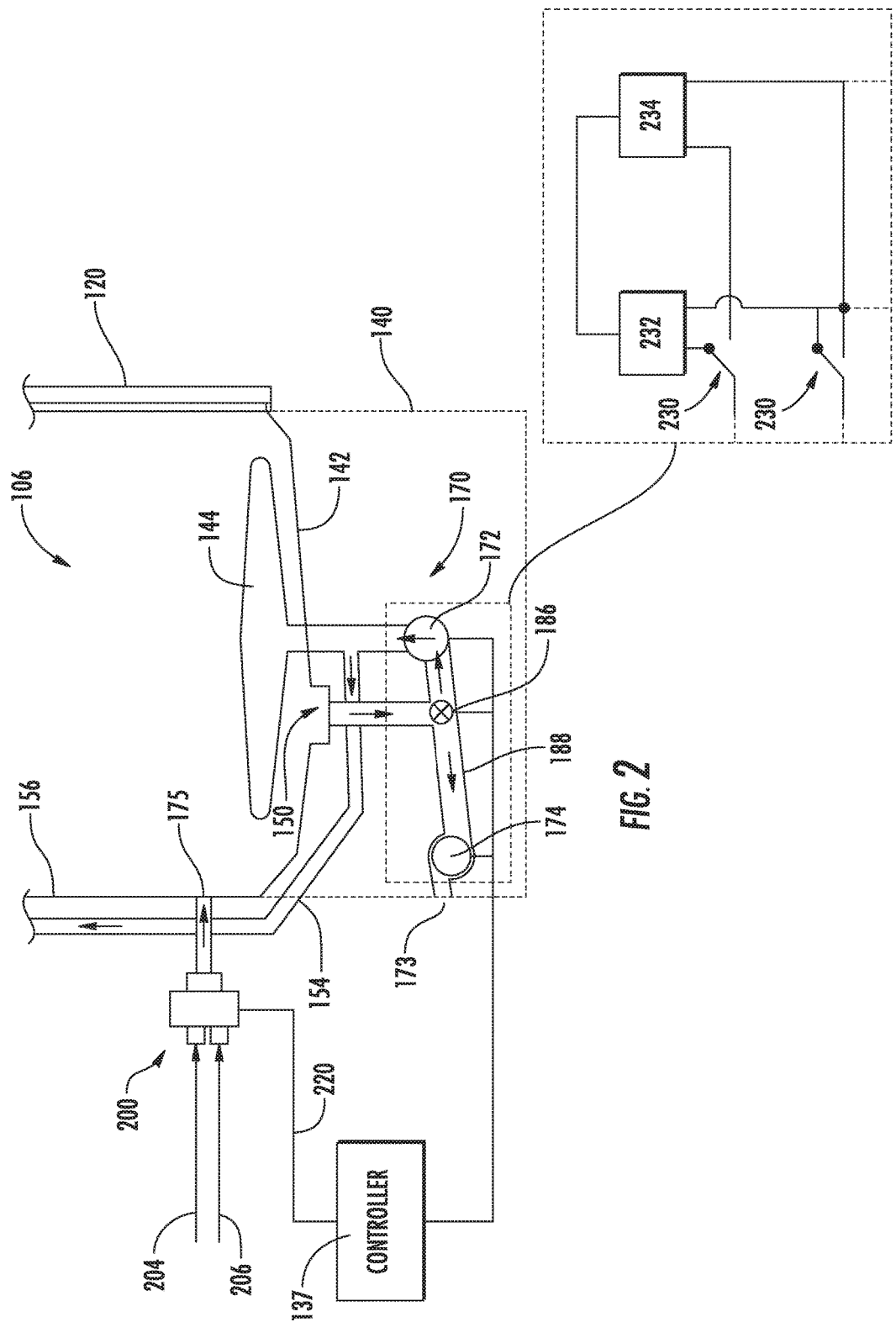
FIG. 2 depicts a schematic view of a fluid system of the appliance of FIG. 1.

FIG. 2 depicts a schematic view of a fluid system of the appliance 100. As shown in FIG. 2, the appliance 100 can include a fluid circulation assembly 170 disposed below the wash chamber 106. Although one implementation of the fluid circulation assembly 170 that is operable to perform in accordance with aspects of the present disclosure is shown, it is contemplated that other fluid circulation assembly configurations can similarly be utilized without departing from the spirit and scope of the present disclosure.

The fluid circulation assembly 170 can include a circulation wash pump assembly 172 and a drain pump assembly 174, both in fluid communication with the sump 150. Additionally, the drain pump assembly 174 can be in fluid communication with an external drain 173 to discharge used wash liquid, e.g., to a sewer or septic system (not shown). Further, the circulation wash pump assembly 172 can be in fluid communication with the lower spray arm assembly 144 and a conduit 154 which extends to a back wall 156 of the wash chamber 106, and upward along the back wall 156 for feeding wash liquid to the mid-level spray arm assembly 148 (FIG. 1) and the upper spray arm assembly.

The appliance can include one or more relay(s) 230. The relay(s) 230 can be adjusted between various positions such that power can be provided to one or more components of the appliance 100. For instance, the relay(s) 230 can be adjusted to a position associated with a wash pump motor 232 to provide power to drive the pump mechanism of the circulation wash pump assembly 172. Additionally, and/or alternatively, the relay(s) 230 can be adjusted to a position associated with a drain pump motor 234 to provide power to drive the pump mechanism of the drain pump assembly 174.

As wash liquid is pumped through the lower spray arm assembly 144, and further delivered to the mid-level spray arm assembly 148 and the upper spray arm assembly (not shown), washing sprays can be generated in the wash chamber 106, and wash liquid can collect in the sump 150. The sump 150 can include a cover to prevent larger objects from entering the sump 150, such as an item that is dropped beneath the lower rack 132. A coarse filter and a fine filter (not shown) can be located adjacent to the sump 150 to filter wash liquid for sediment and particles of predetermined sizes before flowing into the sump 150.

A turbidity sensor (not shown) can be coupled to the sump 150 and used to sense a level of sediment in the sump 150 and to initiate a sump purge cycle where the contents or a fractional volume of the contents of the sump 150 can be discharged when a turbidity level in the sump 150 approaches a predetermined threshold. The sump 150 can be filled with water through an inlet port 175 which outlets into the wash chamber 106.

A water supply 200 can be configured with the inlet port 175 for supplying wash liquid to the wash chamber 106. The water supply 200 can provide hot water only, cold water only, or either selectively as desired. As depicted, the water supply 200 can include a hot water inlet 204 that can receive hot water from an external source, such as a hot water heater and a cold water input 206 that can receive cold water from an external source. It should be understood that the term "water supply" is used herein to encompass any manner or combination of valves, lines or tubing, housing, and the like, and may simply comprise a conventional hot or cold water connection.

As shown in FIG. 2, a drain valve 186 can be established in flow communication with the sump 150 and can open or close flow communication between the sump 150 and a drain pump inlet 188. The drain pump assembly 174 can be in flow communication with the drain pump inlet 188 and can include an electric motor for pumping fluid at the inlet 188 to an external drain system via the drain 173. In one implementation, when the drain pump assembly 174 is energized, a negative pressure can be created in the drain pump inlet 188 and the drain valve 186 can be opened, allowing fluid in the sump 150 to flow into the fluid pump inlet 188 and be discharged from the fluid circulation assembly 170 via the external drain 173.

Additionally and/or alternatively, the drain and recirculation pump assemblies 172 and 174 can be connected directly to the side or the bottom of the sump 150, and the drain and the pump assemblies 172, 174 can each include their own valving replacing the drain valve 186. Other fluid circulation systems are possible as well, drawing fluid from the sump 150 and providing fluid as desired within the wash chamber 106 or draining fluid out of the appliance 100.

Figure 3:
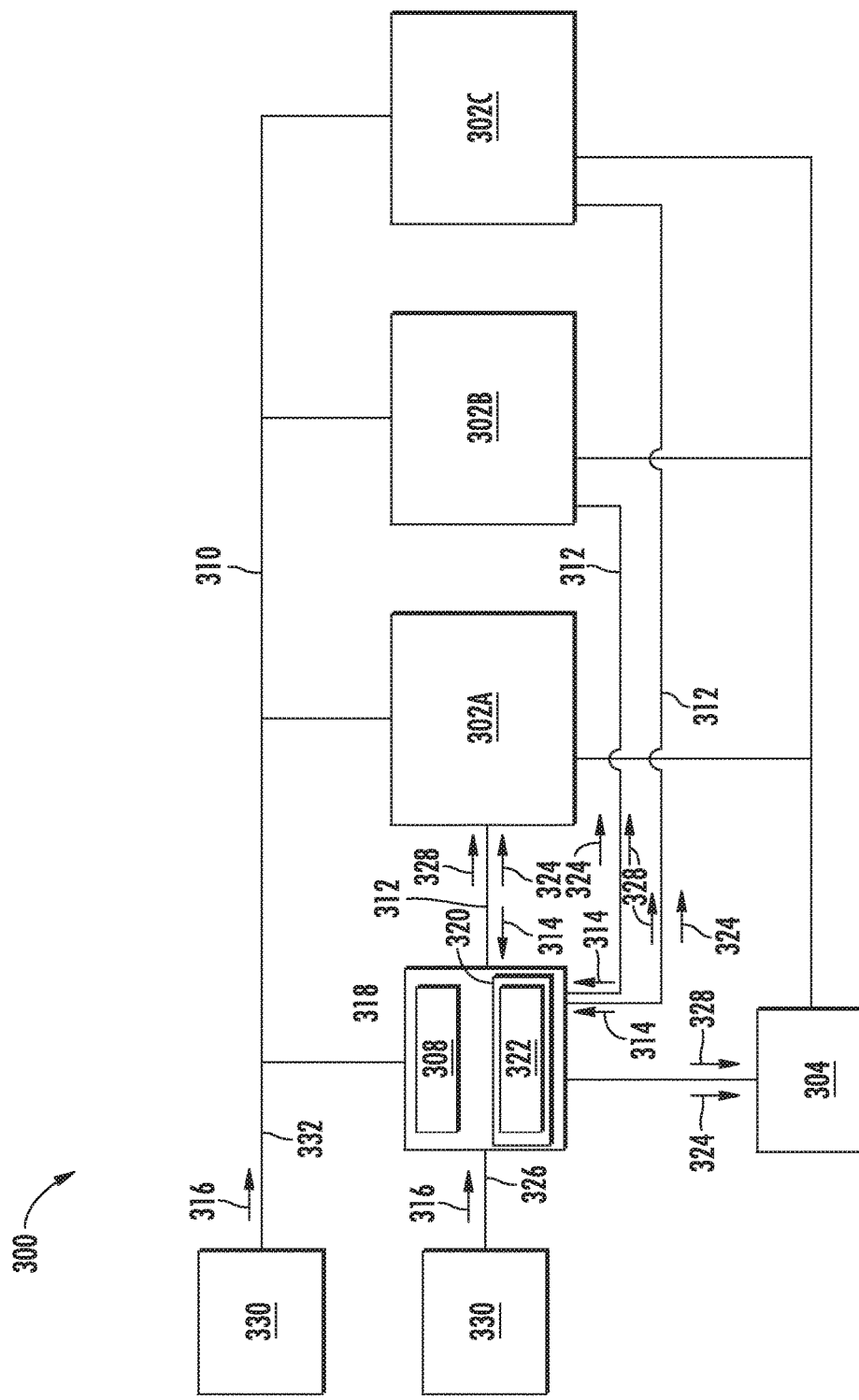
FIG. 3 depicts an example system for managing appliance power consumption according to example embodiments of the present disclosure.

FIG. 3 depicts an example system 300 for managing appliance power consumption according to example embodiments of the present disclosure. The system 300 can be implemented in an appliance such as, for example, a power cycle-based appliance (e.g., the appliance 100) that can shift between more than one power consumption modes. The appliance 100 (e.g., implementing system 300) can include one or more system microcontrollers 302A-C, one or more power source(s) 304, a stimulus device 306, and one or more low power management microcontroller(s) 308. The components of the system 300 can be in wired and/or wireless communication. For example, the system microcontrollers 302A-C and the low power management microcontroller(s) 308 can be configured to communicate with one another via a serial bus 310 and/or one or more direct general purpose input output line(s) 312.

The number and types of components shown in FIG. 3 are not intended to be limiting. Those of ordinary skill in the art, using the disclosure provided herein, will understand that the system 300 can include different types, numbers, and/or configurations of components than shown. For example, in some embodiments, the system 300 can include a plurality of system microcontroller(s) and still perform the aspects of the present disclosure as described herein.

Each of the system microcontrollers 302A-C can be associated with at least one appliance component. For example, in the event the system 300 is implemented in the appliance 100 (e.g., a washing appliance, a dishwashing appliance) a first system microcontroller 302A can be associated with the user interface 136 of the appliance 100, a second system microcontroller 302B can be associated with one or more relays 230 of the appliance 100, and/or a third system microcontroller 302C can be associated with the drain pump assembly 174 of the appliance 100. Each of the system microcontrollers 302A-C can include one or more processor(s) and one or more memory device(s). The one or more memory device(s) can store instructions that when executed by the one or more processor(s) of the system microcontrollers 302A-C cause the one or more processor(s) to perform operations to control the component(s) associated with the respective system microcontroller.

Each of the system microcontrollers 302A-C can be configured to enter a plurality of power consumption states. For instance, the system microcontrollers 302A-C can be configured to enter into an active state when, for example, the appliance 100 and/or the component associated with the system microcontroller 302A-C is in operation and/or as further described herein. While in the active state, the respective system microcontroller 302A-C can require an amount of power to properly perform its control functions with respect to its associated appliance component. Moreover, when in the active state, the system microcontroller 302A-C can be configured to send one or more communication(s) 314 to the low power management microcontroller(s) 308 indicating that at least one of the system microcontrollers 302A-C is in an active state.

The system microcontrollers 302A-C can be configured to enter into an inactive state. For example, the system microcontrollers 302A-C can enter into an inactive state when the appliance 100 and/or the component associated with the system microcontroller 302A-C is not in operation. When in the inactive state, the system microcontroller 302A-C can be configured to cease sending the communication(s) 314 to the low power management microcontroller(s) 308.

The system microcontrollers 302A-C can be configured to enter into a lower power mode. As further described herein, the system microcontrollers 302A-C can enter the lower power mode after entering into the inactive state. The respective system microcontroller 302A-C can be configured to consume less power in the lower power mode than while in the active state (and/or the inactive state). For instance, while in the lower power mode the system microcontrollers 302A-C can be configured to consume a low amount, de-minis amount, and/or zero amount of power.

Each of the system microcontrollers 302A-C can be configured to receive power from the one or more power source(s) 304. The one or more power source(s) 304 can include a battery, external power source, etc. configured to supply power to at least the system microcontrollers 302A-C. Moreover, the power source(s) 304 can be configured to provide various amounts of power to the system microcontrollers 302A-C. For example, when the system microcontrollers 302A-C are in the active state, the power source(s) 304 can be configured to provide an amount of power that is sufficient for the system microcontrollers 302A-C to operate in the active state.

The system 300 can include one or more stimulus device(s) 306. The stimulus device 306 can include a controller and can be associated with an input device (e.g., button, keypad, user interface, sensor). In some implementations, the stimulus device(s) 306 can be included with the controller 137 of appliance 100 and/or be associated with the user interface 136. In other implementations, the stimulus device(s) 306 can be separate from the controller 137.

The stimulus device 306 can be configured to provide a stimulus signal to the low power management microcontroller(s) 308. For instance, the stimulus device 306 can be configured to can receive an input (e.g., via the input device)

indicative of a user (e.g., of the appliance 100) or a need for at least one component of the appliance 100 to operate. The stimulus device 306 can be configured to provide one or more stimulus signal(s) 316 to the low power management microcontroller(s) 308. The stimulus signal(s) 316 can be indicative of a need for at least one of the system microcontrollers 302A-C to be in the active state, for example, to accommodate the user.

The low power management microcontroller(s) 308 can be configured to manage power consumption of the system microcontrollers 302A-C. For instance, the low power management microcontroller(s) 308 can be included in one or more computing device(s) 318 (e.g., microcontroller) configured to manage power consumption. The computing device(s) 318 and/or low power management microcontroller(s) 308 can have a lower power requirement to operate than the system microcontrollers 302A-C. The low power management microcontroller(s) 308 can be associated with one or more memory devices 320. The one or more memory device(s) 320 can store instructions 322 that when executed by low power management microcontroller(s) 308 cause the low power management microcontroller(s) 308 to perform the operations for which the low power management microcontroller(s) 308 are configured. For instance, the low power management microcontroller(s) 308 can perform operations for managing the power consumption of the system microcontrollers 302A-C, as described herein. In some implementations, the low power management microcontroller(s) 308 can be included with the controller 137 of appliance 100. In other implementations, the low power management microcontroller(s) 308 can be separate from the controller 137.

The low power management microcontroller(s) 308 can be configured to monitor a state of each of the system microcontrollers 302A-C of the plurality of system microcontrollers. For example, low power management microcontroller(s) 308 can be configured to monitor the state of each of the system microcontrollers 302A-C by receiving the communication(s) 314 indicating that at least one of the microcontrollers 302A-C is in an active state.

The low power management microcontroller(s) 308 can be configured to determine that one or more of the system microcontroller(s) 302A-C are in an inactive state. For instance, the low power management microcontroller(s) 308 can be configured to determine that one or more of the system microcontroller(s) 302A-C is in the inactive state when the low power management microcontroller(s) 308 cease receiving the communication(s) 314 indicating that at least one of the microcontrollers is in the active state. Such an instance can arise, for example, when the appliance 100 (and/or one or more of its components) are not in operation.

The low power management microcontroller(s) 308 can be configured to place the inactive system microcontrollers 302A-C in the lower power mode. For instance, based, at least in part, on the determination that one or more system microcontrollers 302A-C are in an inactive state, the low power management microcontroller(s) 308 can send one or more first command signal(s) 324 to place the system microcontroller(s) 302A-C (that are in the inactive state) in a lower power mode.

In one example, the low power management microcontroller(s) 308 can be configured to send one or more first command signal(s) 324 via the serial bus 310 to the system microcontroller(s) 302A-C. The system microcontroller(s) 302A-C can be configured to receive the first command signal(s) 324 and reduce power consumption (e.g., by ceasing performance of one or more of its functions). Accordingly, the system microcontroller(s) 302A-C can consume less power in the lower power mode than while in the active state and/or in the inactive state.

In another example, the low power management microcontroller(s) 308 can be configured to send the first command signal(s) 324 via one or more general purpose input output line(s) 312 to the system microcontroller(s) to place them in the lower power mode. The system microcontroller(s) 302A-C can be configured to receive the first command signal(s) 324 via the general purpose input output line(s) 312 and reduce power consumption accordingly.

The low power management microcontroller(s) 308 can also be configured to return the system microcontroller(s) 302A-C to the active state from the lower power mode. For example, a user can interact with the appliance 100 (e.g., via user interface 136) to operate the appliance 100. In response, the stimulus device 306 can be configured to send one or more stimulus signal(s) 316 based, at least in part, on the user interaction with the appliance 100, to the low power management microcontroller(s) 308 (e.g., via bus 326). The stimulus signal(s) 316 can be indicative of a need for one or more of the system microcontroller(s) 302A-C to return to the active state. The low power management microcontroller(s) 308 can be configured to receive the one or more stimulus signal(s) 316 from the stimulus device 306. The low power management microcontroller(s) 308 can be configured to send one or more second command signal(s) 328 to remove at least one of the system microcontroller(s) 302A-C from the lower power mode based, at least in part, on receiving the stimulus signals 316.

In another example, the system 300 can include an external communication system 330 that can provide a stimulus signal 316 to the low power management microcontroller(s) 308. The external communication system 330 can be associated with a wireless network, wireless network, cloud-based network, internet, etc. In one implementation, a separate appliance, energy management system, separate computing device, server, etc. can communicate with the external communication system 330 via one or more networks to indicate that one or more of the system microcontrollers 302A-C should return to the active state. The external communication system 330 can be configured to send a stimulus signal 316 to the low power management microcontroller(s) 308. After receiving the stimulus signal 316 from the external communication system 330, the low power management microcontroller(s) 308 can send one or more second command signal(s) 328 to return the system microcontroller(s) 302A-C to the active state.

The low power management microcontroller(s) 308 can also, and/or alternatively, return the system microcontrollers to the inactive state from the lower power mode, in a similar manner to that described above. This can occur, for instance, when the presence of a user is detected within the vicinity of the appliance 100.

By using the low power management microcontroller(s) 308 to monitor and manage the state of the system microcontrollers 302A-C, the power consumption of the appliance 100 can be reduced. For example, the functions of the low power management microcontroller(s) 308 can be limited to those described herein, such as, monitoring the state of the system microcontrollers 302A-C, determining entry into an inactive state, placing the system microcontrollers 302A-C in a lower power mode, monitoring for a stimulus signal 316, and/or returning the system microcontrollers 302A-C to an active state. These functions can require less power (e.g., 1.0%, 0.1%) than if each of the system microcontrollers 302A-C were to perform such functions itself. The equipment of the one or more low power management microcontroller(s) 308 can have a reduced power requirement relative to the system microcontrollers 302A-C. Accordingly, use of the low power management microcontroller(s) 308 in the manner described herein can reduce the overall power consumption of the appliance 100.

Figure 4:
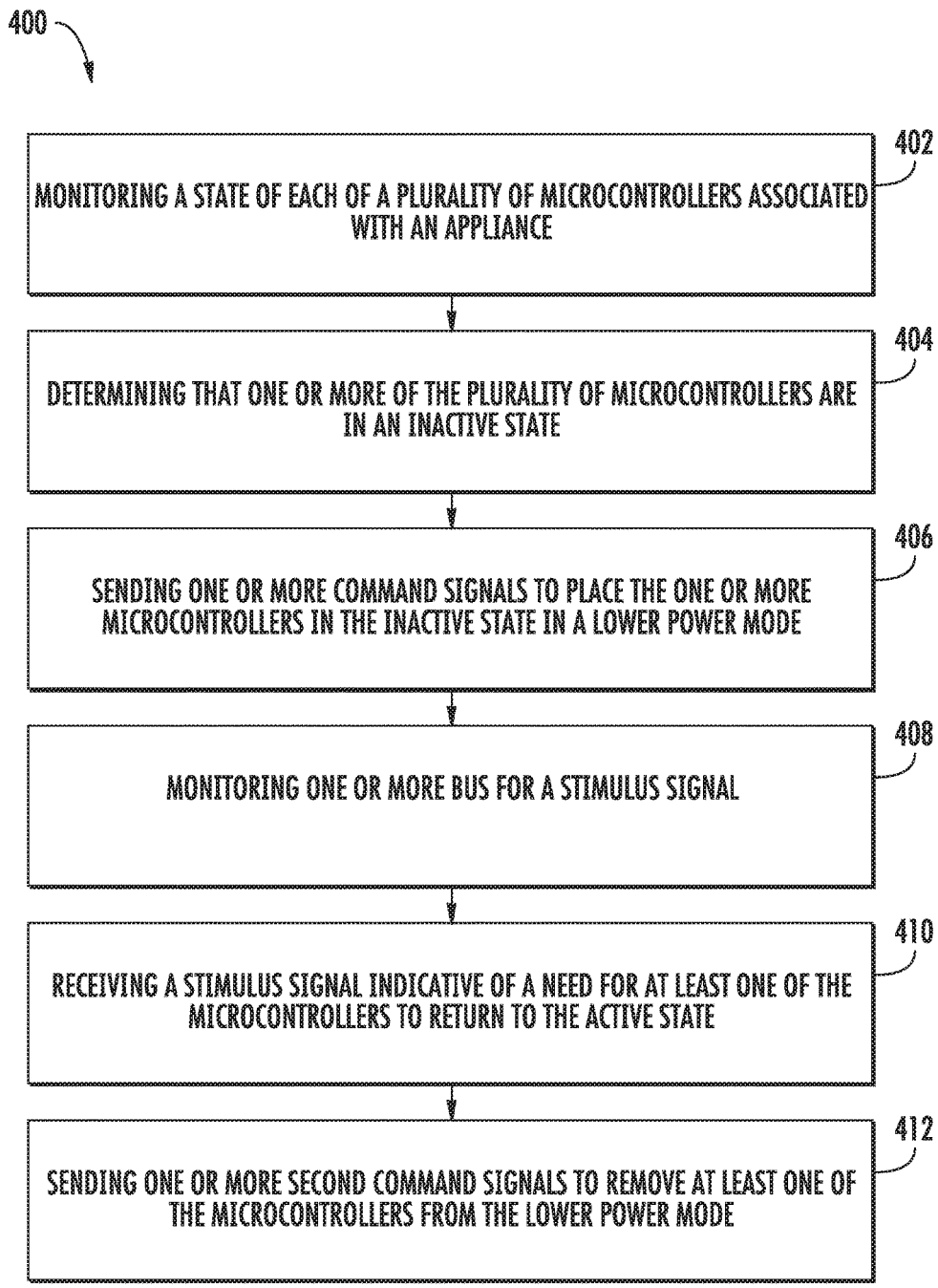
FIG. 4 depicts an example method of managing appliance power consumption according to example embodiments of the present disclosure.

FIG. 4 depicts an example method 400 of managing appliance power consumption according to example embodiments of the present disclosure. The method 400 can be implemented in an appliance, such as a washing appliance as described herein. FIG. 4 can be implemented by one or more computing devices, such as the low power management microcontroller(s) 308 depicted in FIG. 3. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (402), the method 400 can include monitoring a state of each of a plurality of microcontrollers associated with an appliance. For instance, the low power management microcontroller(s) 308 can monitor a state of each of the system microcontrollers 302A-C. The low power management microcontroller(s) 308 can monitor and/or receive one or more communication(s) 314 from one or more of the system microcontroller(s) 302A-C. As indicated above, the communication(s) 314 can be indicative of a state of one or more of the system microcontroller(s) 302A-C. For example, the communication(s) 314 can indicate that at least one of the system microcontroller(s) 302A-C is in an active state.

At (404), the method 400 can include determining that one or more of the plurality of microcontrollers are in an inactive state. For instance, the low power management microcontroller(s) 308 can determine that one or more of the system microcontroller(s) 302A-C are in an inactive state based, at least in part, on the communication(s) 314. As indicated above, in some implementations, the low power management microcontroller(s) 308 can determine that a system microcontroller 302A-C is inactive when the low power management microcontroller(s) 308 determine that they are no longer receiving the communication(s) 316.

At (406), the method 400 can include sending one or more command signals to place the one or more microcontrollers in the inactive state in a lower power mode. For instance, the low power management microcontroller(s) 308 can send one or more first command signal(s) 314 to place one or more of the system microcontroller(s) 302A-C (that are in the inactive state) in a lower power mode based, at least in part, on the determination that the one or more system microcontroller(s) 302A-C are in the inactive state. As described herein, the low power management microcontroller(s) 308 can send the one or more command signals via a serial bus 310 and/or a general purpose input output line 312 to the system microcontrollers 302A-C in the inactive state. In another example, the low power management microcontroller(s) 308 can send command signal(s) 324 to the power source(s) 304 associated with the appliance 100 to reduce power to the one or more system microcontroller(s) 302A-C.

Additionally, and/or alternatively, the low power management microcontroller(s) 308 can place the appliance 100 in a lower power mode by reducing power to individual components (e.g., system microcontroller(s) 302A-C). For example, the low power management microcontroller(s) 308 can place the appliance 100 in a lower power mode by reducing power to all unnecessary components (e.g., components that are not required for safety reasons). In such a case, the low power management microcontroller(s) 308 can send one or more command signal(s) (e.g., to the power source(s) 304) to reduce power to the unnecessary components, thereby placing the appliance 100 in the lower power mode.

At (408), the method 400 can include monitoring one or more bus for a stimulus signal. For instance, the low power management microcontroller(s) 308 can monitor a bus 326 associated with the stimulus device 306 for a stimulus signal 316 indicating the need for one or more system microcontrollers 302A-C to return to the active state (e.g., because a user intends to use the appliance 100). Additionally, and/or alternatively, 308 can monitor a bus 332 associated with external communication system 330 for the stimulus signal 316.

At (410), the method 400 can include receiving a stimulus signal indicative of a need for at least one of the microcontrollers to return to the active state. For instance, the low power management microcontroller(s) 308 can receive a stimulus signal 316 from the stimulus device 306 and/or the external communication system 330, as described above. The stimulus signal can be indicative of a need for at least one of the system microcontrollers 302A-C to return to the active state At (410), the method 400 can include sending one or more command signals to remove at least one of the microcontrollers from the lower power mode. For instance, the low power management microcontroller(s) 308 can remove one or more of the system microcontrollers 302A-C from the lower power mode based, at least in part, on receiving the stimulus signal 316. As indicated above, the low power management microcontroller(s) 308 can send one or more second command signal(s) 328 to remove at least one of the system microcontrollers 302A-C from the lower power mode. The second command signals can be sent directly to the system microcontrollers 302A-C (e.g., via serial bus 310, general purpose input output line 312) and/or to the power source(s) 304. The system microcontrollers 302A-C and/or the power source(s) 304 can thereafter reduce power.

The technology discussed herein makes computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, the appliance comprising:
a plurality of system microcontrollers, wherein each of the system microcontrollers is associated with at least one appliance component; and
one or more low power management microcontrollers configured to:
monitor a state of each of the system microcontrollers of the plurality of microcontrollers;
determine that one or more of the system microcontrollers of the plurality of system microcontrollers are in an inactive state;
send one or more command signals to place the one or more system microcontrollers in the inactive state in a lower power mode based at least in part on the determination that the system microcontroller is in the inactive state, wherein the respective system microcontroller consumes less power in the lower power mode than while in an active state;
receive one or more stimulus signals indicative of a need for the one or more system microcontrollers to be in the active state; and
send one or more second command signals to remove the one or more system microcontrollers from the lower power mode based at least in part on the one or more stimulus signals.

2. The appliance of claim 1, wherein the one or more low power management microcontrollers have a reduced power requirement relative to the system microcontrollers.

3. The appliance of claim 1, wherein the one or more low power management microcontrollers are configured to monitor the state of each of the system microcontrollers of the plurality of system microcontrollers by receiving one or more communications indicating that at least one of the system microcontrollers is in the active state.

4. The appliance of claim 3, wherein the one or more low power management microcontrollers are configured to determine that one or more of the system microcontrollers of the plurality of system microcontrollers is in the inactive state when the one or more low power management microcontrollers cease receiving the one or more communications indicating that at least one of the system microcontrollers is in the active state.

5. The appliance of claim 1, wherein the one or more low power management microcontrollers are configured to send the one or more command signals to place the one or more system microcontrollers in lower power mode via a serial bus to the one or more system microcontrollers.

6. The appliance of claim 1, wherein the one or more low power management microcontrollers are configured to send the one or more command signals to place the one or more system microcontrollers in the lower power mode via a general purpose input output line to the one or more system microcontrollers.

7. The appliance of claim 1, wherein the appliance is a washing appliance, and wherein the plurality of system microcontrollers comprises a first microcontroller associated with a user interface of the washing appliance, a second microcontroller associated with one or more relays of the washing appliance, and a third microcontroller associated with a drain pump assembly of the washing appliance.

8. A method of managing appliance power consumption, the method comprising:
monitoring, by one or more low power management microcontrollers, a state of each of a plurality of system microcontrollers associated with an appliance;
determining, by the one or more low power management microcontrollers, that one or more of the plurality of system microcontrollers are in an inactive state;
sending, by the one or more low power management microcontrollers, one or more command signals to place the one or more system microcontrollers in the inactive state in a lower power mode based at least in part on the determination that the one or more system microcontrollers is in the inactive state, wherein the lower power mode is associated with a reduced power consumption by the respective microcontroller than while in an active state;
receiving, by the one or more low power management microcontrollers, a stimulus signal, wherein the stimulus signal is indicative of a need for the one or more system microcontrollers to return to the active state; and
sending, by the one or more low power management microcontrollers, one or more command signals to remove the one or more system microcontrollers from the lower power mode based at least in part on receiving the stimulus signal.

9. The method of claim 8, wherein monitoring, by the one or more low power management microcontrollers, the state of each of the plurality of system microcontrollers associated with the appliance comprises:
receiving, by the one or more low power management microcontrollers, one or more communications from at least one of the plurality of system microcontrollers, wherein the communications indicate that at least one of the system microcontrollers is in the active state.

10. The method of claim 8, wherein determining, by the one or more low power management microcontrollers, that one or more of the plurality of system microcontrollers are in the inactive state comprises:
determining, by the one or more low power management microcontrollers, that the computing device is no longer receiving one or more communications indicating that the one or more system microcontrollers are in the active state.

11. The method of claim 8, wherein sending, by the one or more low power management microcontrollers, one or more command signals to place the one or more system microcontrollers in the inactive state in the lower power mode comprises:
sending, by the one or more low power management microcontrollers, the one or more command signals via a serial bus to the one or more system microcontrollers in the inactive state.

12. The method of claim 8, wherein sending, by the one or more low power management microcontrollers, one or more command signals to place the one or more system microcontrollers in the inactive state in the lower power mode comprises:
sending, by the one or more low power management microcontrollers, the one or more command signals via a general purpose input output line to the one or more system microcontrollers in the inactive state.

13. The method of claim 8, wherein sending, by the one or more low power management microcontrollers, one or more command signals to place the one or more system microcontrollers in the inactive state in the lower power mode comprises:

sending, by the one or more low power management microcontrollers, the one or more command signals to one or more power sources associated with the appliance to reduce power to the one or more system microcontrollers in the inactive state.

14. The method of claim 8, further comprising monitoring, by the one or more low power management microcontrollers, one or more bus for the stimulus signal.

15. The method of claim 8, wherein the stimulus signal is based at least in part on a user interaction with the appliance.

16. A dishwashing appliance, comprising:
   a first system microcontroller associated with a user interface;
   a second system microcontroller associated with one or more relays;
   a third system microcontroller associated with a drain pump assembly; and
   one or more low power management microcontrollers configured to:
      monitor one or more communications associated with at least one of the first system microcontroller, second system microcontroller, or third system microcontroller, wherein the one or more communications are indicative of a state of least one of the first system microcontroller, second system microcontroller, or third system microcontroller;
      determine that at least one of the first system microcontroller, second system microcontroller, or third system microcontroller is in an inactive state based at least in part on the one or more communications;
      place the at least one system microcontroller in the inactive state in the lower power mode based at least in part on the determination that the respective system microcontroller is in the inactive state, wherein the respective system microcontroller consumes less power in the lower power mode than while in an active state;
      receive a stimulus signal indicative of a need for at least one of the first system microcontroller, second system microcontroller, or third system microcontroller to return to the active state; and
      remove at least one of the first system microcontroller, second system microcontroller, or third system microcontroller from the lower power mode based at least in part on receiving the stimulus signal.

17. The dishwashing appliance of claim 16, wherein the one or more low power management microcontrollers are configured to send one or more command signals to place the at least one system microcontroller in the lower power mode.

\* \* \* \* \*